(12) United States Patent
Hussain

(10) Patent No.: US 10,018,145 B2
(45) Date of Patent: Jul. 10, 2018

(54) SYSTEM AND METHOD FOR IN-CYLINDER THERMAL ENERGY RECOVERY AND CONTROLLING CYLINDER TEMPERATURE

(71) Applicant: Ford Global Technologies, LLC, Dearborn, MI (US)

(72) Inventor: Quazi Ehtesham Hussain, Holland, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 158 days.

(21) Appl. No.: 15/013,786

(22) Filed: Feb. 2, 2016

(65) Prior Publication Data

US 2017/0218878 A1    Aug. 3, 2017

(51) Int. Cl.
| | |
|---|---|
| *F02F 1/10* | (2006.01) |
| *F02B 7/00* | (2006.01) |
| *F01K 23/06* | (2006.01) |
| *F02F 1/40* | (2006.01) |
| *F01N 5/02* | (2006.01) |
| *F02B 37/00* | (2006.01) |
| *F02G 5/02* | (2006.01) |
| *F02G 5/04* | (2006.01) |

(52) U.S. Cl.
CPC .............. *F02F 1/10* (2013.01); *F01K 23/065* (2013.01); *F01N 5/02* (2013.01); *F02B 37/00* (2013.01); *F02F 1/40* (2013.01); *F02G 5/02* (2013.01); *F02G 5/04* (2013.01); *F02G 2262/00* (2013.01); *Y02T 10/166* (2013.01)

(58) Field of Classification Search
CPC ..... F02F 1/10; F02F 1/40; F02B 37/00; F02G 5/02; F02G 5/04; F02G 2262/00; F01K 23/065; F01N 5/02; Y02T 10/166
USPC ................ 60/605.1, 605.2, 614, 616, 618
See application file for complete search history.

(56) References Cited

U.S. PATENT DOCUMENTS

| | | | |
|---|---|---|---|
| 3,884,194 A | 5/1975 | Grosseau | |
| 3,964,263 A | 6/1976 | Tibbs | |
| 4,031,705 A | * 6/1977 | Berg | ........................ F02G 5/00 |
| | | | 123/41.19 |
| 4,235,077 A | * 11/1980 | Bryant | .................... F01K 23/14 |
| | | | 123/198 F |
| 4,901,531 A | 2/1990 | Kubo et al. | |
| 6,253,745 B1 | 7/2001 | Prater | |

(Continued)

FOREIGN PATENT DOCUMENTS

| | | |
|---|---|---|
| CN | 202611813 U | 12/2012 |
| DE | 102012015927 A1 | 2/2014 |
| WO | 2011073718 A2 | 6/2011 |

*Primary Examiner* — Hoang Nguyen
(74) *Attorney, Agent, or Firm* — Julia Voutyras; McCoy Russell LLP

(57) ABSTRACT

Methods and systems are provided for an in-cylinder thermal energy recovery device that utilizes the Rankine Cycle to recover energy from exhaust gasses that may be used to produce additional work in the vehicle. In one example, a method may include outfitting the head area of each cylinder of an engine with a tube array comprising one or more tubes passing through the combustion chamber of the corresponding cylinder. Each tube array may receive an injection of working fluid that is based, in part, on the temperature of the tube array's corresponding cylinder, which may then be utilized to recover heat energy.

20 Claims, 4 Drawing Sheets

(56) References Cited

U.S. PATENT DOCUMENTS

| | | | |
|---|---|---|---|
| 6,947,831 B2* | 9/2005 | van Nieuwstadt | B01D 46/0036 123/193.6 |
| 8,661,816 B2* | 3/2014 | Mathews | F01N 5/02 123/25 P |
| 2008/0022682 A1* | 1/2008 | Tafas | F01K 23/065 60/618 |
| 2014/0331970 A1* | 11/2014 | Bidner | F02D 19/0642 123/435 |

* cited by examiner

SYSTEM AND METHOD FOR IN-CYLINDER THERMAL ENERGY RECOVERY AND CONTROLLING CYLINDER TEMPERATURE

FIELD

The present description relates generally to methods and systems for recovering thermal energy from the exhaust gases of a combustion cylinder of a motor vehicle.

BACKGROUND/SUMMARY

Internal combustion engines generate motive power (e.g., mechanical work) by the burning of fossil fuels within combustion chambers of the engine. During combustion, the hot exhaust gasses produced are used to drive a piston, and/or to carry out other work in the vehicle, as they expand. The hot exhaust gasses then travel through an exhaust system of the vehicle before exiting into the atmosphere. A byproduct of combusting the fossil fuels is heat. Only a small fraction of the energy located in fossil fuel chemical bonds is used to propel the motor vehicle forwards, and much of the energy is lost to the environment in the form of unusable, entropic heat. The combustion of fossil fuels within the combustion chambers happens in a repetitious and cyclic manner, and may therefore be considered a type of thermodynamic cycle. By recovering and subsequently utilizing the heat produced during the step or steps of the combustion cycle when heat is produced as a byproduct (e.g., combustion), it may be possible to recover thermal energy from exhaust gases in the internal combustion engine in order to enhance fuel economy.

As one example, a method for recovering and utilizing waste thermal energy from exhaust gases in an internal combustion engine may include utilizing a bottoming cycle, such as a Rankine Cycle, to generate mechanical or electrical power, referred to herein as work, from the entropic heat of the exhaust gasses generated during combustion. Specifically, the waste heat of the exhaust gasses may be transferred to a working fluid to generate a steam that may be used to generate work within the motor vehicle, thereby enhancing fuel economy. The working fluid steam is then condensed into liquid form to reenter and begin the thermodynamic Rankine cycle anew. One example approach is shown by Gleich et al. in DE Patent Application No. 201210015927. Therein, Gleich discloses a waste-gas heat exchanger installed in a combustion cylinder liner, wherein the liner contains a working fluid that may be converted to steam to generate work in the vehicle, in a Rankine Cycle style.

However, the inventors herein have recognized potential issues with such systems. As one example, cylinders have varying temperatures from one another depending on operating conditions of the vehicle, and cooling cylinders homogenously via the same amount of working fluid in each cylinder liner when one or more cylinders are already at a relatively cool temperature, may have negative effects on combustion efficacy and fuel economy.

In one example, the issues described above may be addressed by a method comprising individually injecting fluid into a plurality of tubes of a tube array, where each tube of the plurality of tubes passes through a combustion chamber of a corresponding engine cylinder in an area of a head of the engine cylinder, based on a temperature of the engine cylinder; and recovering heat energy from the injected fluid after it passes through each tube. In this way, the fluid, which herein may be referred to as a working fluid, may be converted from a liquid to gaseous state by the waste heat in exhaust gasses in order to do additional work in the motor vehicle, in a fashion tailored to each individual combustion cylinder, thereby increasing combustion efficiency and fuel economy.

As one example, a controller may be used to monitor the temperature of each combustion cylinder and the amount and/or timing of the fluid injected into the corresponding engine cylinder may be modified so that the temperature of the cylinder is kept within a threshold combustion range. For example, if an engine cylinder is running hotter than its counterparts, more fluid may be injected into the tubing passing through that cylinder to help cool it down. Alternatively, if a particular engine cylinder is running below a temperature threshold, less or no fluid may be injected into the tubing passing through that cylinder in order to increase the temperature of the cylinder and put it on par with the other cylinders of the engine.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
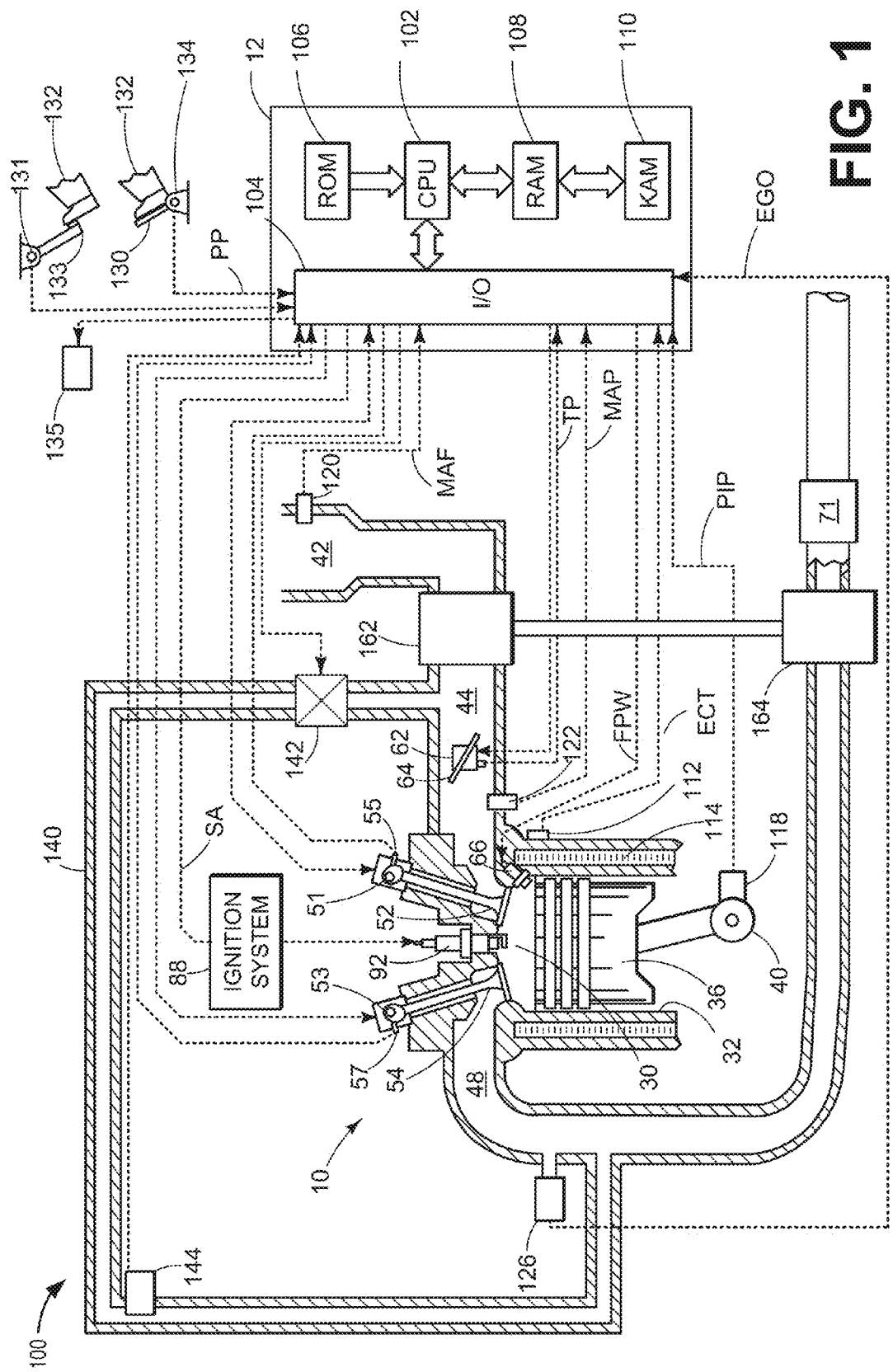
FIG. 1 is a block diagram of an engine system in a vehicle.
Figure 2:
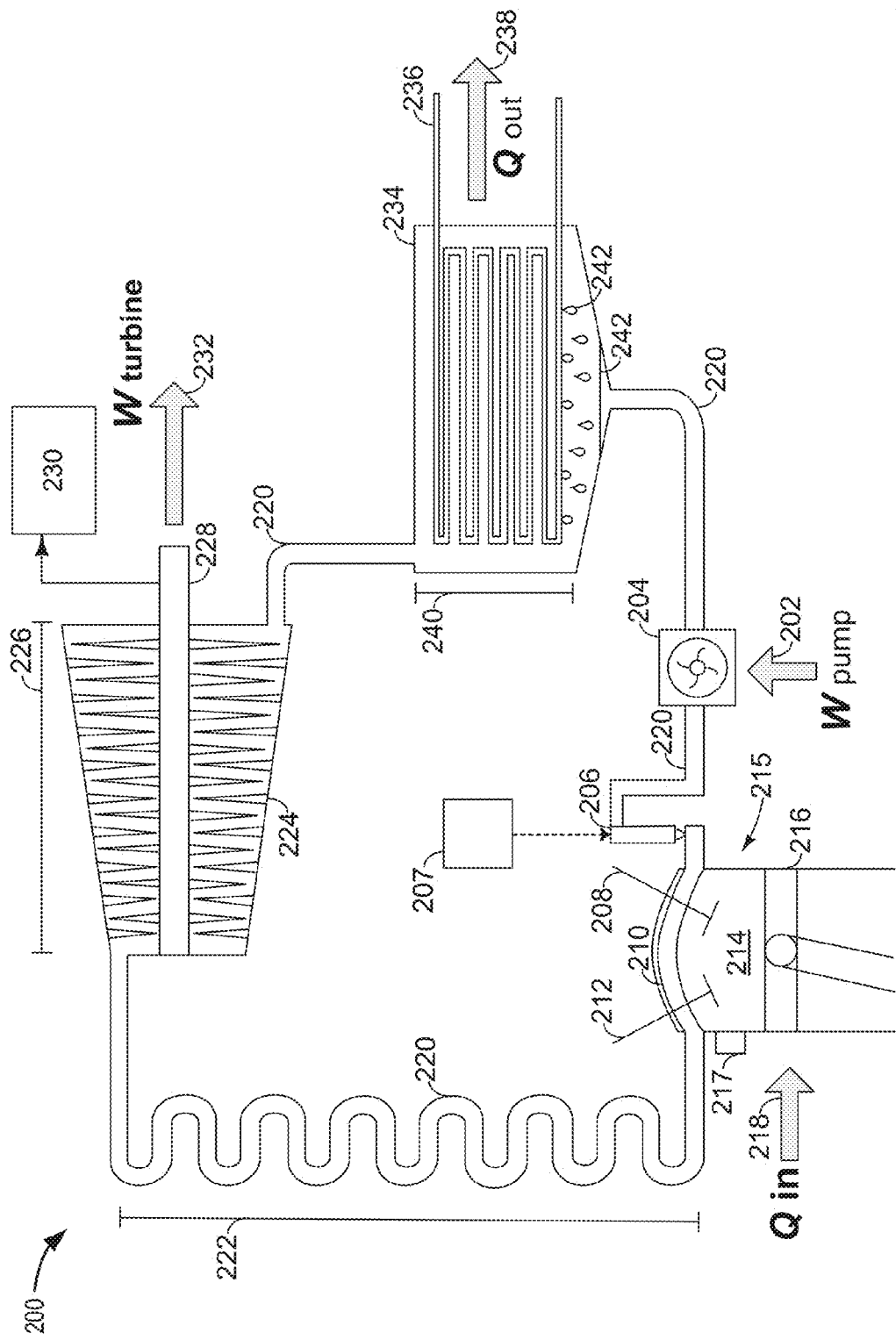
FIG. 2 shows an example in-cylinder thermal energy recovery system.
Figure 3:
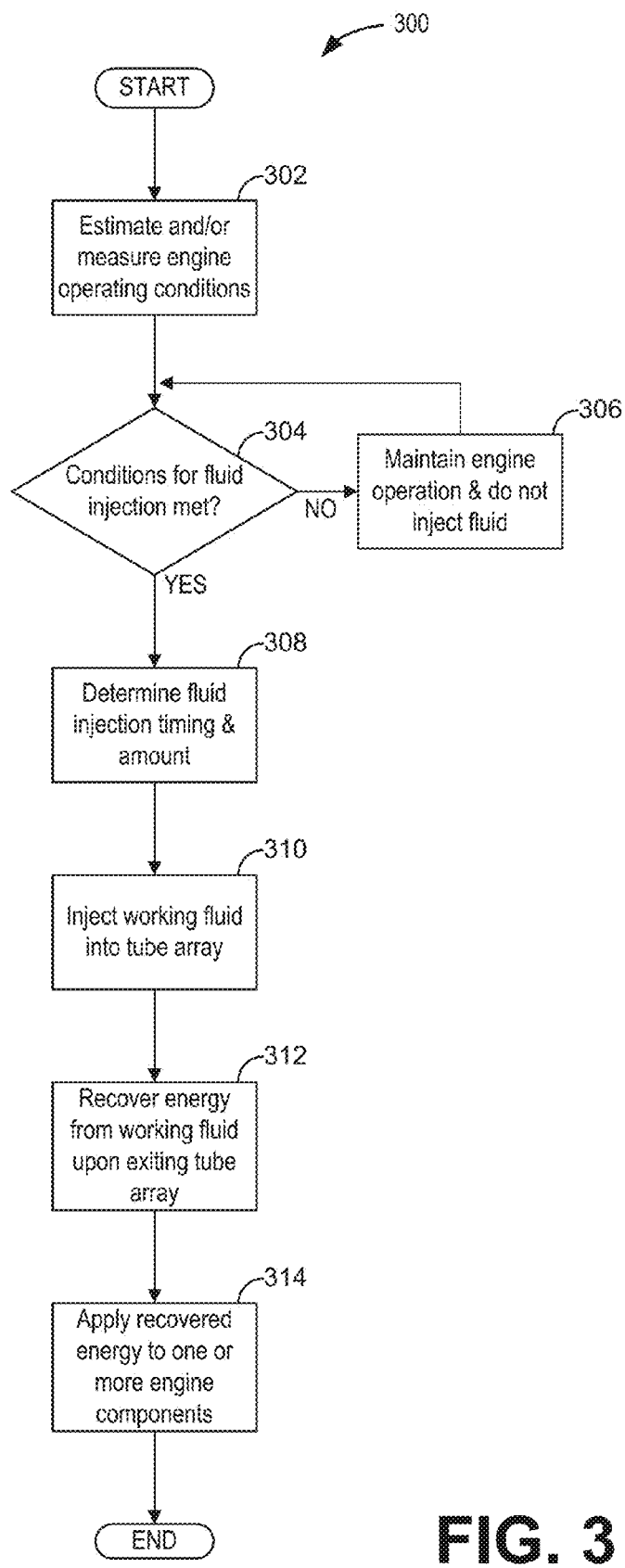
FIG. 3 shows a flowchart illustrating a method of utilizing fluid injectors and an in-cylinder thermal energy recovery system in a Rankine Cycle fashion, in response to engine operating conditions.
Figure 4:
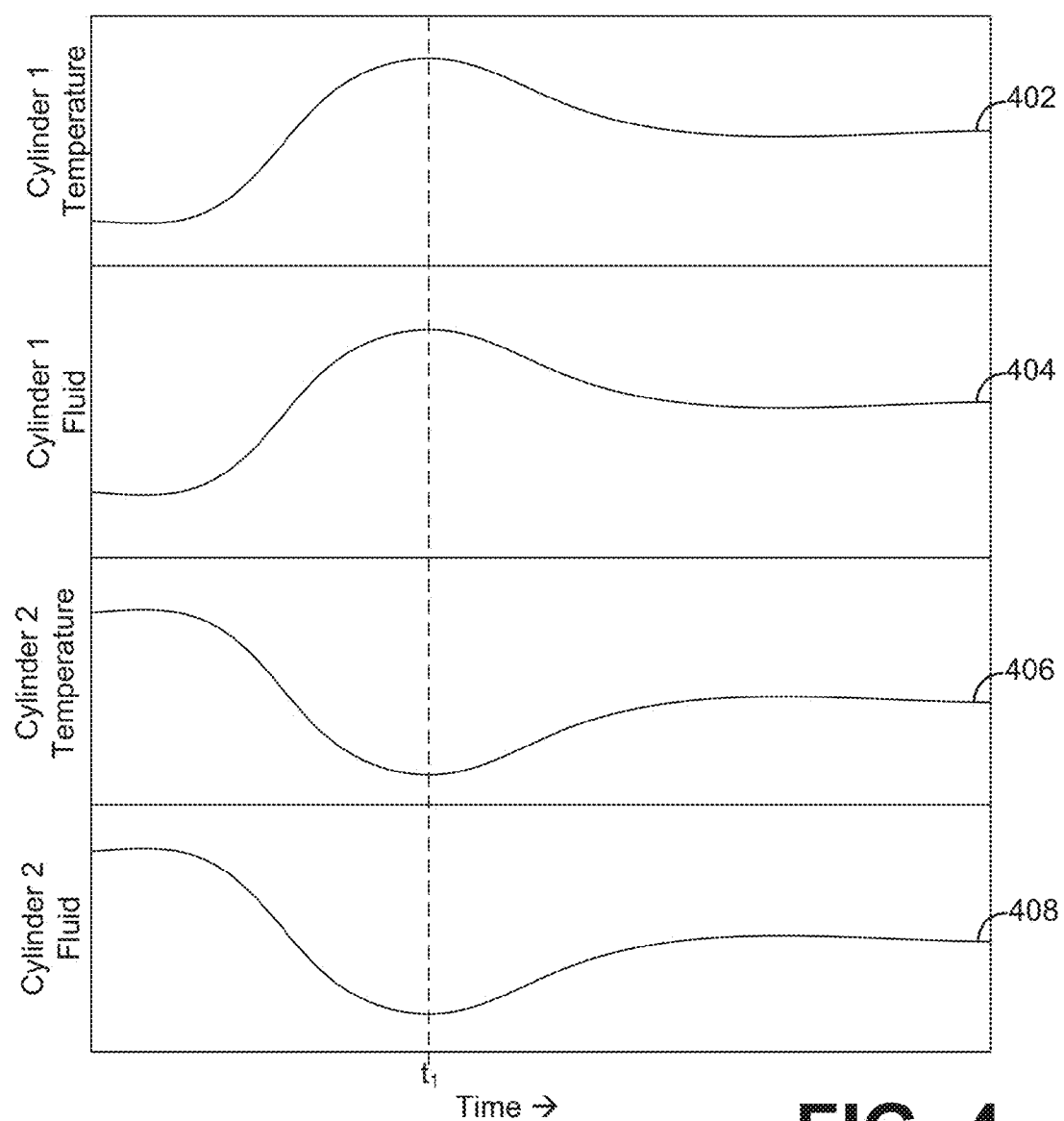
FIG. 4 shows a graph illustrating the relationship between individual engine cylinder temperatures and fluid injection volumes.

The following description relates to systems and methods for recovering waste heat from exhaust gasses in an engine system, such as the engine system shown in FIG. 1. FIG. 2 shows an example apparatus for converting the waste heat in exhaust gasses to work, within a vehicle. As shown in FIG. 2, a combustion cylinder, herein referred to as cylinder, may be outfitted with a tube array located in the head area of the cylinder, which may then receive fluid injection via a fluid injector located upstream of the cylinder. As shown in FIG. 2, the tube array may be in thermal communication with heat from exhaust gasses produced during in-cylinder combustion via the wall of the tube array, and the injected fluid may then be vaporized by ambient heat of the immediate surroundings. Vaporized fluid may then be used to accomplish additional work within the vehicle, before undergoing condensation and reentering the tube array. FIG. 3 shows a flowchart illustrating a method for controlling the amount of fluid (e.g., working fluid) injected into each cylinder of the engine, in response to individual cylinder temperatures and vehicle operating conditions. The flow chart of FIG. 3 further illustrates how the injected fluid may siphon waste-heat from exhaust gasses in order to accomplish additional work in the vehicle. The graph of FIG. 4 shows how the fluid (e.g., working fluid) of the described embodiment may be used to control engine cylinder temperatures. Specifically, FIG. 4 illustrates the inversely-proportional relationship between a temperature of a specific cylinder and the volume of fluid injected into the specific cylinder. In this way, fluid injection into a tube array passing through cylinders of the engine may serve the dual purpose of extracting additional work from the waste-heat of exhaust gasses as well as individually monitoring and regulating individual cylinder temperatures, thereby increasing fuel economy.

FIG. 1, schematically illustrates one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. The vehicle may include a clutch 135. In one example, engine 10 may be controlled at least partially by the controller 12, and input from a vehicle operator 132 via a clutch pedal 133 and a clutch pedal sensor 131. One input to controller 12 may be from a clutch pedal sensor 131. The clutch pedal sensor 131 senses the position of the clutch pedal 133. The position of the clutch pedal 133 determines the engagement state of the clutch 135. The clutch pedal state is used in the example given in this description because it is a convenient way to describe the monitoring of the engagement state of the clutch. However, it will be appreciated that instead of sensing clutch pedal position, other methods could be used to monitor and provide a feedback of clutch engagement state. In another example, the clutch 135 may be an automatic clutch. As such, the controller 12 may send a signal to actuate the clutch 135 into different positions based on engine operating conditions. As explained further below, the clutch 135 may include a clutch actuator that utilizes rotative power produced by another element (such as a shaft coupled to a turbine, as shown in FIG. 2) to actuate and move the clutch 135.

Combustion chamber (i.e., cylinder) 30 of engine 10 may include combustion chamber walls 32 with piston 36 positioned therein. In some embodiments, the face of piston 36 inside cylinder 30 may have a bowl. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10. Further still, the crankshaft 40 may be powered by steam from the present embodiment, described in further detail in subsequent figures.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via a respective intake valve 52 and exhaust valve 54. In some embodiments, combustion chamber 30 may include two or more intake valves and/or two or more exhaust valves.

Intake valve 52 may be controlled by controller 12 via electric valve actuator (EVA) 51. Similarly, exhaust valve 54 may be controlled by controller 12 via EVA 53. Alternatively, the variable valve actuator may be electro hydraulic or any other conceivable mechanism to enable valve actuation. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT.

Fuel injector 66 is shown coupled directly to combustion chamber 30 for injecting fuel directly therein in proportion to the pulse width of signal FPW received from controller 12. In this manner, fuel injector 66 provides what is known as direct injection of fuel into combustion chamber 30. The fuel injector 66 may be mounted in the side of the combustion chamber or in the top of the combustion chamber, for example. Fuel may be delivered to fuel injector 66 by a fuel system (not shown) including a fuel tank, a fuel pump, and a fuel rail.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark. In light of the present embodiment, the combustion chamber may contain additional components and use those components with novel methodologies pertaining to the described embodiment, found in subsequent figure descriptions.

Intake passage 42 or intake manifold 44 may include a throttle 62 having a throttle plate 64. In this particular example, the position of throttle plate 64, or a throttle opening, may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass airflow sensor 120 and a manifold air pressure sensor 122 for providing respective signals MAF and MAP to controller 12.

Further, an exhaust gas recirculation (EGR) system may route a desired portion of exhaust gas from exhaust passage 48 to intake manifold 44. In this example, high pressure (HP) EGR passage 140 is illustrated. The amount of EGR provided to intake manifold 44 may be varied by controller 12 via HP EGR valve 142. Further, an EGR sensor 144 may be arranged within the HP EGR passage 140 and may provide an indication of one or more of pressure, temperature, and concentration of the exhaust gas. Alternatively, the EGR flow may be controlled through a calculated value based on signals from the MAF sensor (upstream), MAP (intake manifold), MAT (manifold gas temperature) and the crank speed sensor. Further, the EGR flow may be controlled based on an exhaust O2 sensor and/or an intake oxygen sensor (intake manifold). Under some conditions, the EGR system may be used to regulate the temperature of the air and fuel mixture within the combustion chamber and/or the temperature proximate to a gasoline particulate filter (not shown). While FIG. 1 shows a high pressure EGR system, a low pressure EGR system may additionally, or alternatively, be used. In a low pressure EGR system, EGR may be routed from downstream of a turbine of a turbocharger to upstream of a compressor of the turbocharger, as show in FIG. 1.

As such, engine 10 may further include a compression device such as a turbocharger or supercharger including at least a compressor 162 arranged along intake manifold 44. For a turbocharger, compressor 162 may be at least partially driven by a turbine 164 (e.g., via a shaft) arranged along exhaust passage 48. For a supercharger, compressor 162 may be at least partially driven by the engine 10 and/or an electric machine, and may not include a turbine. Thus, the amount of compression provided to one or more cylinders of the engine via a turbocharger or supercharger may be varied by controller 12.

Exhaust gas sensor 126 is shown coupled to exhaust passage 48 upstream of emission control device (ECD) 70. Exhaust gas sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. In some embodiments, exhaust gas sensor 126 may be used in conjunction with an oxygen sensor (not shown) and/or a temperature sensor (not shown).

Emission control device (ECD) 71 is shown arranged along exhaust passage 48 downstream of exhaust gas sensor 126. The ECD 71 includes a three way catalytic converter (TWC), a gasoline particulate filter (GPF), and may optionally include one or more sensors, such as a pressure sensor, or temperature sensor.

Controller 12 is shown in FIG. 1 as a microcomputer, including microprocessor 102, input/output ports 104, an electronic storage medium (e.g., computer-readable) for executable programs and calibration values shown as read-only memory 106 in this particular example, random access memory 108, keep alive memory 110, and a data bus. Controller 12 may receive various signals from sensors coupled to engine 10, in addition to those signals previously discussed, including measurement of inducted mass airflow (MAF) from mass airflow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP), or throttle opening, from a throttle position sensor; and absolute manifold pressure signal, MAP, from pressure sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft. The controller 12 receives signals from the various sensors of FIG. 1 and employs the various actuators of FIG. 1 to adjust engine operation based on the received signals and instructions stored on a memory of the controller.

Storage medium read-only memory 106 can be programmed with computer readable data representing instructions executable by microprocessor 102 for performing the methods described herein, as well as other variants that are anticipated but not specifically listed. As described above, FIG. 1 shows only one cylinder of a multi-cylinder engine, and each cylinder may similarly include its own set of intake/exhaust valves, fuel injector, spark plug, etc.

FIG. 2 shows a portion of an internal combustion cylinder in an internal combustion engine, including the modified cylinder of the present embodiment, and accompanying components of the in-cylinder thermal energy recovery system 200. In some examples, the modified cylinder of the in-cylinder thermal energy recovery system 200 described herein, may be cylinder 30 of FIG. 1. Thus, cylinder 215 shown in FIG. 2 may be employed in the engine 100 shown in FIG. 1.

As shown in FIG. 2, the in-cylinder thermal energy recovery system 200 includes a pump 204, work input 202, a fluid injector 206, an intake valve 208, an exhaust valve 212, a tube array 210, a combustion chamber 214, a cylinder 215, a piston 216, a temperature sensor 217, heat input 218, a tubing 220, a thermal gradient 222, a turbine 224, a thermal gradient 226, a shaft 228, an engine component 230, work output 232, a condenser 234, coolant tubes 236, heat output 238, a thermal gradient 240 and condensate 242.

FIG. 2 shows an example of a Rankine cycle that has been modified to work with an internal combustion engine. The Rankine cycle is an idealized thermodynamic cycle of a heat engine (e.g., internal combustion engine) that converts heat into mechanical work. The heat is supplied externally to a closed loop, which usually uses water as the working fluid. In FIG. 2, the heat is supplied externally by exhaust gasses in combustion chamber 214 to the closed loop that is tubing 220. The efficiency of the Rankine Cycle is limited by the high heat of vaporization of the working fluid. While the working fluid of FIG. 2 is water, the working fluid in alternative embodiments may be organic in nature. The working fluid, herein sometimes referred to as fluid, in a Rankine cycle follows a closed loop via tubing 220 and is reused constantly. The Rankine cycle may be subdivided into four processes, noted in FIG. 2 as work input 202, heat input 218, work output 232 and heat output 238.

Looking at FIG. 2, the first process of the Rankine cycle begins with work input 202, and is depicted illustratively as "W pump". As one example, a controller 207 (such as controller 12 shown in FIG. 1) actuates the pump 204 to operate and pump the working fluid through the tubing 220 of the in-cylinder thermal energy recovery system 200 and to the fluid injector 206. The condensate 242 of the working fluid is pumped from low to high pressure within tubing 220. As the fluid is a liquid at this stage, the pump requires little input energy. The working fluid is pumped from pump 204, downstream, to fluid injector 206, thus ending the first process (i.e., work input 202) of the Rankine Cycle, and beginning the second process (i.e., heat input 218). In this embodiment, each cylinder 215 (only one shown in FIG. 2) of the engine is outfitted with at least one fluid injector 206. Additionally, each cylinder 215 includes a tube array 210, where each tube array includes one or more tubes passing through the combustion chamber 214 of the cylinder 215. For example, each tube array 210 may include an array of parallel tubes passing through an interior of the cylinder 215. The fluid injector 206 for each cylinder may be coupled to the tube array 210 for the corresponding cylinder 215 (so that working fluid from the fluid injector 206 passes through an interior of the one or more tubes of the tube array 210 within the cylinder 215).

Fluid injector 206 injects working fluid into tube array 210 depending on the temperature of that corresponding cylinder and engine operating conditions. For example, the controller 207 may actuate the fluid injector 206 to inject working fluid into the tube array 210. The controller 207 may adjust, via the fluid injector 206, the timing and amount of the individually injected fluid for the cylinder 215, based on the temperature of the cylinder 215 (as determined based on an output of the temperature sensor 217 received at the controller 207). For example, for a plurality of cylinders, each cylinder including its own tube array 210 and fluid injector 206, the controller may individually adjust the timing and amount of the fluid injected into each tube array 210 via individual actuation of each fluid injector 206, based on the temperature of each individual cylinder.

Fluid injector 206 may inject fluid into the corresponding tube array 210 of cylinder 215 at the beginning of an exhaust stroke of the cylinder 215. Known to those skilled in the art, at the beginning of the exhaust stroke, the combustion chamber 214 is full of exhaust gas and the piston 216 is at bottom dead center (BDC). As the exhaust stroke continues, the exhaust valve 212 is opened (while the intake valve 208 remains closed) and the piston 216 ascends towards top dead center (TDC). As the exhaust gasses are compressed by the piston 216 and directed towards open exhaust valve 212, they come into contact with the external wall of the one or more tubes of tube array 210. As a result, the hot exhaust gases heat the working fluid passing through the interior of the one or more tubes of tube array 210, within the combustion chamber 214 of cylinder 215. Fluid injector 206 may not begin injecting fluid into its corresponding cylinder 215 tube array 210 until after the engine has reached a threshold temperature. Each fluid injector 206 may be individually actuated and or monitored by the controller 207, such as engine controller 12 of FIG. 1. To recapitulate, controller oversight allows different amounts of working fluid (e.g., via Pulse Width Modulation) to be injected into each tube array passing through each cylinder 215 and the ability to control working fluid injection (timing and volumetric amount) at each cylinder 215 individually. Controlling the amount of working fluid injected at each cylinder 215, allows the controller to monitor and control individual cylinder temperatures. For example, if cylinder 215 is burning too hot (as reported to the engine controller 207 by temperature sensor 217), in response, the controller may send a signal to the fluid injector 206 to inject more fluid, more frequently, until the temperature of the cylinder drops below a predetermined temperature threshold. Once the working fluid is released in the form of atomized liquid by fluid injector 206, it travels downstream to tube array 210 and cylinder 215.

Tube array 210 may be located in the head area (e.g., topmost area) of cylinder 215, proximate to the intake valve 208 and/or exhaust valve 212. Tube array 210 is a sub-portion of tubing 220, in so far as tube array 210 is coupled to tubing 220 on either side of cylinder 215. As introduced above, tube array 210 may be comprised of a plurality of tubes, where each tube of the plurality of tubes passes through the combustion chamber 214 of the corresponding engine cylinder 215. There may be at least one tube array 210 with at least one corresponding fluid injector 206 for each cylinder 215. The tube array 210 may be used to transport working fluid and function as a heat-exchanger between the waste-heat of exhaust gasses in combustion chamber 214 and the working fluid in the tube array 210. It will be appreciated that the tubing of tube array 210 is separated from the combustion chamber 214 of the cylinder 215 via a wall, so that the working fluid is never in direct contact with the air-fuel mixture of cylinder 215. The tube array 210 may be consistent in cross-sectional volume and shape, or it may present in various geometric configurations for optimal efficiency in recovering waste-heat. For example, tube array 210 may have a larger surface area surrounding exhaust valve 212, in order to siphon more waste-heat from exhaust gasses to the working fluid. Such a configuration may allow for more heat to be exchanged between exiting exhaust gasses at their peak temperature, and the working fluid located in the interior of the tube array 210 walls, which in turn allows for more work to be generated from the waste-heat of the exhaust gasses (to be discussed in greater detail further below).

To recapitulate, looking at FIG. 2, the second process of the Rankine Cycle may be depicted by heat input 218, represented illustratively as "Q in". During heat input 218, waste-heat from the exhaust gasses contained in combustion chamber 214 are transferred conductively through the walls of tube array 210 to the working fluid within. The injected, atomized, working fluid then undergoes a phase change due to the increase in heat in the surrounding area, from a high pressure liquid to a dry saturated vapor, before exiting downstream of the combustion chamber 214 to tubing 220.

Once in tubing 220, the dry saturated vapor continues towards upstream turbine 224. Whilst traveling along tubing 220 towards turbine 224, the vapor may experience a decrease in temperature due to convection/conduction depicted by thermal gradient 222. It will be appreciated that whilst the vapor may lose a portion of its heat as it moves towards turbine 224, it does not resume a liquid state, but maintains a vaporized state capable of generating work.

Once the working fluid, in its dry saturated vapor state, arrives at turbine 224, the third process of the Rankine Cycle may begin. The third process, referred to in FIG. 2 as work output 232, and depicted illustratively as "W turbine", signifies the transformation of recovered heat energy to work output. As the vapor of the working fluid expands through turbine 224, it causes the turbine 224 to rotate, thus rotating shaft 228 and generating rotational energy (e.g., torque) that may be used for work (e.g., power). Shaft 228 is coupled to an engine component 230. Engine component 230 represents a component of the engine (such as engine 100 of FIG. 1) that can utilize rotational energy, wherein "utilize rotational energy" means that the engine component 230 may apply the recovered energy to carry out and/or supplement operation. In one embodiment, engine component 230 may be a crankshaft, alternator, or clutch, such as crankshaft 40 and clutch 135 of FIG. 1.

Returning to FIG. 2, as the working fluid in its vaporized state expands through turbine 224, there may be a decrease in temperature and pressure of the vapor, and some condensation may occur. The decrease in temperature and pressure may occur in a continuous manner along thermal gradient 226. Once the working fluid has successfully reached the terminal portion of the turbine 224, it exits the turbine 224 and reenters tubing 220. The working fluid then travels through tubing 220 to exit an opposite aperture at the top-most portion of condenser 234. At condenser 234 is where the fourth process of the Rankine cycle takes place, referred to as heat output 238, and illustratively depicted as "Q out". During the heat output 238 phase of the Rankine Cycle, the working fluid in a wet vapor state enters the condenser 234, where it is condensed via coolant tubes 236 at a constant pressure to return to its initial saturated liquid state (e.g., condensate 242). The decrease in temperature of the working fluid may take place along thermal gradient 240, of the condenser 234. Having condensed to a condensate 242, the working fluid may exit the condenser 234 through another portion of tubing 220, where it travels towards pump 204 to begin the Rankine Cycle anew.

In this way, waste-heat from exhaust gasses may be used to generate work elsewhere in the vehicle, thereby increasing fuel economy. Furthermore, individual cylinder temperatures may be monitored and regulated via a temperature sensor 217, controller, and fluid injector 206, which may increase component durability.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example Turning to FIG. 3, a method 300 for adjusting and operating an in-cylinder thermal energy recovery system, such as the in-cylinder thermal energy recovery system 200 shown in FIG. 2, is shown. Instructions for carrying out method 300 may be executed by a controller (such as controller 12 shown in FIG. 1 and/or controller 207 shown in FIG. 2) based on instructions stored on a memory of the controller and in conjunction with signals received from sensors of the engine system, such as the sensors described above with reference to FIGS. 1-2. The controller may employ engine actuators (e.g., such as actuators of fluid injectors, such as fluid injector 206 shown in FIG. 2) of the engine system to adjust engine operation, according to the methods described below. FIG. 3 begins at 302, where engine operating conditions are estimated and/or measured. Estimating and/or measuring engine operating conditions may include processing incoming data from sensors within and/or outside of the in-cylinder thermal energy recovery system, determining engine temperature, cylinder temperature, if the vehicle is in cruise control, if the vehicle is accelerating/decelerating, if the vehicle is under cold-start conditions, etc. For example, engine operating conditions may include engine speed and/or load, ambient temperature, engine temperature, individual cylinder temperatures, etc.

At 304 the method includes determining if the conditions for fluid injection are met. As described above with reference to FIG. 2, the working fluid of an in-cylinder thermal energy recovery system is released into the tube array of an individual engine cylinder, in a temporally and volumetrically controlled manner, via a corresponding fluid injector. If an individual cylinder temperature is not high enough so that vaporization of the working fluid through the tube array is possible, then the controller may determine that conditions for fluid injection into the tube array of that cylinder are not being met, and the method proceeds to 306. For example, the method at 304 may include determining, for each cylinder, whether cylinder temperature is greater than a threshold, where the threshold is based on a value at which working fluid may be vaporized and utilized for energy recovery.

At 306, the method includes maintaining engine operation and not injecting fluid into the tube array of the cylinder. The cylinder will continue to function as it normally would, going through the four steps of combustion known to those skilled in the art, without receiving working fluid injection into the corresponding tube array for that cylinder. For example, fuel may be injected into the cylinder via a fuel injector, but no working fluid may be injected into the tube array passing through the cylinder via the corresponding fluid injector. The controller may continually monitor the temperature of the cylinder via a temperature sensor located in, on, and/or proximate to the cylinder, to see if conditions for fluid injections are being met. It will be appreciated, that each cylinder is individually monitored for temperature and is, as is described below, assessed by the controller individually. For example, one cylinder in an engine may not be meeting the conditions for fluid injection while the remaining cylinders do. In this example, the one cylinder that is not meeting conditions for fluid injection may receive no working fluid in its corresponding tube array, while the remaining cylinders receive customized amounts of working fluid in their corresponding tube arrays. A cylinder will continue to maintain engine operation and withhold fluid injection via a fluid injector until conditions for fluid injection are met. Once conditions for fluid injection are met, the method proceeds to 308.

At 308, the method includes determining fluid injection timing and amount. As previously mentioned, the fluid injectors located at individual cylinders are individually monitored and actuated upon. The fluid injectors release atomizing droplets of working fluid into the tube array of a corresponding cylinder, and the timing and amount of liquid released at each cylinder may vary, depending on engine operating conditions. Adjusting the timing and amount of working fluid injected may include increasing the amount of fluid injected as a temperature of the engine cylinder increases. For example, a temperature sensor may relay to a controller that a cylinder's temperature is climbing. In response, the controller may signal the fluid injector of that cylinder to release more fluid in a manner proportional to the temperature. The increased amount of working fluid injected into the corresponding cylinder tube array may siphon away more heat from the cylinder, thereby regulating and/or controlling cylinder and/or combustion temperature. Adjusting the amount of fluid injected may also include adjusting a pulse width modulation (e.g., a digital signal) traveling to the fluid injector. Moreover, adjusting the timing and amount of fluid injected may include retarding the injection timing from the exhaust stroke of the engine cylinder in response to one or more of an indication of engine knock and/or cold start conditions. For example, fluid injection may be advanced to occur during a compression stroke of the cylinder (instead of the exhaust stroke) in response to indications of engine knock (e.g., auto ignition). Once the controller has determined the amount and timing of working fluid to be injected into the tube array at each cylinder by each corresponding fluid injector, the method proceeds to 310.

At 310, the method includes injecting working fluid into the tube array. In response to engine operating conditions, the controller may signal one or more fluid injectors to inject working fluid, in an atomized liquid form, at the beginning of each eligible cylinder's exhaust stroke (or at the timing determined at 308). Owing to the cylinders operating in a time staggered manner, with a certain firing order, working fluid will be injected into all eligible cylinders in a time staggered manner and according to the firing order of the engine, thereby generating a more or less steady stream of vapor, with which to do work. For example, every cylinder of a six-cylinder engine may be eligible for fluid injection. The cylinders may all be operating within the same temperature threshold, and may therefore receive the same amount of working fluid injections. At the beginning of each cylinder's exhaust stroke, working fluid may be injected via a fluid injector in an atomized liquid state into a tube array above a corresponding cylinder where the liquid is then vaporized by conductive waste-heat. While each cylinder may produce vapor at a different point in time, the staggered manner in which the vapor is produced, creates a relatively steady stream of vapor to travel through the rest of the in-cylinder thermal energy recovery system to do work. Having injected working fluid into the corresponding tube array, the method proceeds to 312.

At 312, the method includes recovering energy from the working fluid once it has exited the cylinder via the tube array. Recovering energy from the working fluid may include directing the working fluid via tubing to a turbine. The working fluid in vapor form may thus rotate the turbine, such as turbine 224 of FIG. 2. The energy from the exhaust gasses that was once used to vaporize the working fluid into steam, is thus used to propel a turbine and generate rotational energy (e.g., torque) that may be used for work. As previously disclosed, the work may take the form of mechanical or electrical energy, and may be used to power or supplement multiple engine components, such as a crankshaft or clutch. Having recovered energy from the working fluid in steam form, in order to do work, the method proceeds to 314.

At 314 the method includes applying the recovered energy to one or more engine components. For example, the rotational energy recovered from the turbine may be transferred to another mechanical or electrical component in the engine. As one example, the recovered rotational energy may be used to operate a crankshaft and/or clutch of the engine. In another example, the recovered energy may be used to operate an alternator to produce electricity. The electricity thus generated can be used to offset accessory electrical load which in turn improves the fuel economy by reducing the parasitic load on the engine.

In this way, a vehicle controller may determine during which engine operating conditions it is efficacious to release working fluid into the tube array arranged within a head area of corresponding cylinders. The controller may estimate and/or measure multiple cylinder temperatures simultaneously to determine the amount and timing of fluid to be injected (or not to be injected) at each individual cylinder. The controller may then release customized amounts of working fluid to corresponding cylinders, at different times, in order to generate a vapor from the working fluid, with which to do work.

Turning to FIG. 4, a graph is shown illustrating the relationship between individual engine cylinder temperatures and fluid injection volumes. Looking along the x-axis, the title "Time →" may be seen, indicating that time is represented as advancing along the x-axis, from left to right. Looking along the y-axis of the graph, it may be seen that two cylinders are shown under two different variables. That is to say, the temperature of and working fluid amount injected at each of Cylinder 1 and Cylinder 2 are shown. The amount of these variables present in their respective cylinders is proportional to their position on the y-axis (where a greater y-axis value equates to a greater amount of the variable, either temperature or working fluid amount), at a specific time, defined by position along the x axis. To recapitulate, the temperature of a first cylinder is depicted as Cylinder 1 Temperature. The change in temperature of that first cylinder over time is depicted by line 402. The working fluid amount injected into the tube array of the same first cylinder, is depicted as Cylinder 1 Fluid. The change in working fluid amount injected into the tube array of that first cylinder over time is depicted by line 404. The temperature of a second cylinder is depicted as Cylinder 2 Temperature. The change in temperature of that second cylinder over time is depicted by line 406. The working fluid amount injected into the tube array of the same second cylinder, is depicted as Cylinder 2 Fluid. The change in working fluid amount injected into the tube array of that second cylinder over time is depicted by line 408.

Returning to FIG. 4, and looking at lines 402 and 404, it may be seen that the amount of working fluid injected into the tube array of the first cylinder, is proportional to the temperature (e.g., heat) of the same cylinder. At a point in time denoted in FIG. 4 as $T_1$, it may be seen that as the temperature of the first cylinder increased as it approached $T_1$, so did the working fluid amount that was injected into the tube array of that cylinder. It will be appreciated that while the relationship between working fluid amounts injected into the tube array of cylinders and the corresponding cylinder temperature is a proportional one, that an increase in temperature may cause an increase in working fluid injection, but not the other way around. That is to say, an increase in cylinder temperature may cause the engine controller to actuate a fluid injector to increase the amount of working fluid injected into that cylinder. Said another way, the controller may increase working fluid injection in order to decrease cylinder temperatures, and in response to increasing cylinder temperatures. As previously discussed, working fluid amounts to be injected are determined by engine operating conditions. Working fluid may serve to remove heat from a cylinder via siphoning waste-heat from exhaust gasses. At $T_1$ the temperature of the first cylinder (i.e., Cylinder 1), denoted by line 402, is at a global maxima. In one example, the global maxima is due to engine operating conditions (such as, a steep incline), and a controller signals a fluid injector to release an increased amount of working fluid, so that the working fluid amount at $T_1$, denoted by line 404, is also at a global maxima. After $T_1$, as line 402 decreases, so does line 404. At reduced temperatures, the first cylinder is not capable of vaporizing the same amount of working fluid, and so the amount injected is decreased to meet the new cylinder temperatures.

Looking to the second cylinder of FIG. 4, it may be seen that the same proportional relationship between cylinder temperature and working fluid injection amount continues to exist. That is, as line 406 decreases as it approaches $T_1$, so does 408. As line 406 increases and plateaus as it moves farther away from $T_1$, so does 408. Lines 406 and 408 of the second cylinder offer no insights to the relationship between cylinder temperature and working fluid injection amounts that lines 402 and 404 of the first cylinder did not provide; however, by comparing lines 402 and 404 of the first cylinder to lines 406 and 408 of the second cylinder, it may be seen that each cylinder's working fluid amount injected is respective to that cylinder. For example, more working fluid is injected into cylinder 1 than cylinder 2 since cylinder 1 has a higher temperature than cylinder 2 at $T_1$. Each cylinder is individually monitored and/or actualized upon depending, in part, on the specific temperatures of that specific cylinder. For example, any change in temperature to the first cylinder (that is, any change in line 402) should not be capable of enacting a change on lines 406 or 408, each cylinder is analyzed and treated independently.

In this way, an in-cylinder thermal energy recovery system may be used to generate increased amounts of work without the additional burning of fossil fuels, thereby increasing fuel economy. The technical effect of placing the tube array of the in-cylinder thermal energy recovery system at the head of the engine cylinder, is that a larger amount of energy (i.e., heat) from the exhaust gasses is transferred to the working fluid, leading to a larger amount of work being produced from the same amount of fossil fuels. An additional technical effect of placing the tube array of the in-cylinder thermal energy recovery system at the head of the engine cylinder, is that it allows the controller to regulate cylinder and/or combustion temperature.

As one embodiment, a method for an engine includes individually injecting fluid into a plurality of tube arrays, where each tube array of the plurality of tube array includes one or more tubes passing through a combustion chamber of a corresponding engine cylinder in an area of a head of the engine cylinder, based on a temperature of the corresponding engine cylinder, and recovering heat energy from the injected fluid after it passes through each tube array. In a first example of the method, the method further includes at least partially operating one or more of a crankshaft and clutch of the engine using the recovered heat energy. A second example of the method optionally includes the first example and further includes where the one or more tubes of each tube array is separated from the combustion chamber of the corresponding cylinder via a wall. A third example of the method optionally includes one or more of the first and second examples, and further includes individually injecting fluid into the plurality of tube arrays including individually injecting fluid into each tube array at a beginning of an exhaust stroke of the corresponding engine cylinder. A fourth example of the method optionally includes one or more of the first through third examples, and further includes beginning individually injecting fluid into the plurality of tube arrays after an engine temperature has reached a threshold temperature. A fifth example of the method optionally includes one or more of the first through fourth examples, and further includes adjusting a timing and amount of the individually injected fluid for each tube array of each engine cylinder based on the temperature of the engine cylinder. A sixth example of the method optionally includes one or more of the first through fifth examples, and further includes wherein recovering the heat energy includes expanding vapor exiting the plurality of tube arrays to generate work within a system including a turbine and a compressor. A seventh example of the method optionally includes one or more of the first through sixth examples, and further includes, wherein individually injecting fluid includes, via a controller, actuating individual fluid injectors coupled to each tube array, upstream of each engine cylinder, to inject fluid for a duration, where the duration is based on a desired amount of fluid injection. An eighth example of the method optionally includes one or more of the first through seventh examples, and further includes, not individually injecting fluid into a tube array of the plurality of tube arrays in response to the temperature of the corresponding engine cylinder being below a threshold temperature.

In another example, a method for an engine includes adjusting a timing and amount of fluid injected into a tube array passing through a combustion chamber of an engine cylinder and arranged in a head area of the engine cylinder, proximate to an exhaust valve based on engine operating conditions, recovering heat energy from the injected fluid upon exiting the tube array, downstream of the engine cylinder, and operating an engine component, at least in part, using the recovered heat energy. In a first example of the method, the method further includes, wherein the engine operating conditions include a temperature of the engine cylinder. A second example of the method optionally includes the first example and further includes wherein adjusting the timing and amount of fluid injected includes increasing the amount of fluid injected as the temperature of the engine cylinder increases. A third example of the method optionally includes one or more of the first and second examples, and further includes wherein adjusting the timing and amount of fluid injected includes decreasing the amount of fluid injected as the temperature of the engine cylinder decreases. A fourth example of the method optionally includes one or more of the first through third examples, and further includes wherein adjusting the timing and amount of fluid injected includes advancing the injection timing from the exhaust stroke of the engine cylinder based on an indication of engine knock. A fifth example of the method optionally includes one or more of the first through fourth examples, and further includes wherein adjusting the amount of fluid injected includes adjusting a pulse width modulation of an atomizing fluid injector coupled to the tube array upstream of the engine cylinder. A sixth example of the method optionally includes one or more of the first through fifth examples, and further includes wherein the adjusting the timing and amount of fluid injected into the tube array is performed via a controller, where the controller actuates a fluid injector coupled to the tube array upstream of the engine cylinder.

In another embodiment, a system for an engine comprises a plurality of engine cylinders, a plurality of tube array, where a tube array of the plurality of tube arrays is mounted to a head area of each of the plurality of engine cylinders, each tube array including a plurality of tubes, where each tube of the plurality of tubes passes through a combustion chamber of a corresponding engine cylinder of the plurality of engine cylinders, and where an interior of each tube is isolated from a remainder of the combustion chamber, and a plurality of atomizing fluid injectors, where at least one fluid injector of the plurality of fluid injectors is coupled to an entrance of each tube array, and a heat recovery system coupled to the plurality of tube arrays, both upstream and downstream of the plurality of engine cylinders, and a controller including non-transitory instructions stored in a memory for individually injecting fluid into each tube array of the plurality of tube arrays via the plurality of fluid injectors based on a temperature of the corresponding engine cylinder, recovering heat energy from the injected fluid after passing through each tube array via the heat recovery system, and applying the recovered energy to an additional engine component. In a first example of the method, the method further includes wherein the heat recovery system includes a turbine coupled to a rotatable shaft and a compressor, where the rotatable shaft is coupled to the additional engine component. A second example of the method optionally includes the first example and further includes wherein each tube array includes a larger heat transfer area arranged around an exhaust valve seat of each engine cylinder of the plurality of cylinders. A third example of the method optionally includes one or more of the first and second examples, and further includes, wherein the plurality of tubes of each tube array includes a plurality of parallel tubes passing through and across a diameter of the corresponding engine cylinder, where a greater concentration of the plurality of parallel tubes are positioned around an exhaust vale seat of the corresponding engine cylinder.

The invention claimed is:

1. A method, comprising:
individually injecting fluid into a plurality of tube arrays, where each tube array of the plurality of tube arrays includes one or more tubes passing through a combustion chamber of a corresponding engine cylinder in an area of a head of the engine cylinder, wherein an amount of fluid individually injected into each tube array is based on a temperature of the corresponding engine cylinder; and
recovering heat energy from the injected fluid after it passes through each tube array.

2. The method of claim 1, further comprising at least partially operating one or more of a crankshaft and a clutch of the engine using the recovered heat energy.

3. The method of claim 1, where the one or more tubes of each tube array is separated from the combustion chamber of the corresponding cylinder via a wall.

4. The method of claim 1, wherein individually injecting fluid into the plurality of tube arrays includes individually injecting fluid into each tube array at a beginning of an exhaust stroke of the corresponding engine cylinder.

5. The method of claim 1, further comprising beginning individually injecting fluid into the plurality of tube arrays after an engine temperature has reached a threshold temperature.

6. The method of claim 1, further comprising adjusting a timing of the individually injected fluid for each tube array of each engine cylinder based on the temperature of the engine cylinder.

7. The method of claim 1, wherein recovering the heat energy includes expanding vapor exiting the plurality of tube arrays to generate work within a system including a turbine and a compressor.

8. The method of claim 1, wherein individually injecting fluid includes, via a controller, actuating individual fluid injectors coupled to each tube array, upstream of each engine cylinder, to inject fluid for a duration, where the duration is based on a desired amount of fluid injection.

9. The method of claim 1, further comprising not individually injecting fluid into a tube array of the plurality of tube arrays in response to the temperature of the corresponding engine cylinder being below a threshold temperature.

10. A method, comprising:
adjusting a timing and an amount of fluid injected into a first tube array and a second tube array passing respectively through combustion chambers of a first engine cylinder and a second engine cylinder and arranged in a head area of the first engine cylinder and the second engine cylinder, proximate to an exhaust valve, based respectively on operating conditions of the first engine cylinder and the second engine cylinder;
recovering heat energy from the injected fluid upon exiting the first tube array and the second tube array, downstream of the first engine cylinder and the second engine cylinder; and
operating an engine component, at least in part, using the recovered heat energy.

11. The method of claim 10, wherein the operating conditions include a first temperature of the first engine cylinder and a second temperature of the second engine cylinder.

12. The method of claim 11, wherein adjusting the timing and the amount of fluid injected includes increasing the amount of fluid injected as the first temperature of the first engine cylinder or the second temperature of the second engine cylinder increases.

13. The method of claim 11, wherein adjusting the timing and the amount of fluid injected includes decreasing the amount of fluid injected as the first temperature of the first engine cylinder or the second temperature of the second engine cylinder decreases.

14. The method of claim 10, wherein adjusting the timing and the amount of fluid injected includes advancing the injection timing from an exhaust stroke of the first engine cylinder or the second engine cylinder based on an indication of engine knock.

15. The method of claim 10, wherein adjusting the amount of fluid injected includes adjusting a pulse width modulation of an atomizing fluid injector coupled to the first tube array upstream of the first engine cylinder or the second tube array upstream of the second engine cylinder.

16. The method of claim 10, wherein the adjusting the timing and the amount of fluid injected into the first tube array and the second tube array is performed via a controller, where the controller actuates a first fluid injector coupled to the first tube array upstream of the first engine cylinder and a second fluid injector coupled to the second tube array upstream of the second engine cylinder.

17. A system for an engine, comprising:
a plurality of engine cylinders;
a plurality of tube arrays, where a tube array of the plurality of tube arrays is mounted to a head area of each of the plurality of engine cylinders, each tube array including a plurality of tubes, where each tube of the plurality of tubes passes through a combustion chamber of a corresponding engine cylinder of the plurality of engine cylinders, and where an interior of each tube is isolated from a remainder of the combustion chamber;
a plurality of atomizing fluid injectors, where at least one fluid injector of the plurality of fluid injectors is coupled to an entrance of each tube array;
a heat recovery system coupled to the plurality of tube arrays, both upstream and downstream of the plurality of engine cylinders; and
a controller including non-transitory instructions stored in a memory for:
individually injecting fluid into each tube array of the plurality of tube arrays via the plurality of fluid injectors based on a temperature of the corresponding engine cylinder;
recovering heat energy from the injected fluid after passing through each tube array via the heat recovery system; and
applying the recovered heat energy to an additional engine component.

18. The system of claim 17, wherein the heat recovery system includes a turbine coupled to a rotatable shaft and a compressor, where the rotatable shaft is coupled to the additional engine component.

19. The system of claim 17, wherein each tube array includes a larger heat transfer area arranged around an exhaust valve seat of each engine cylinder of the plurality of cylinders.

20. The system of claim 17, wherein the plurality of tubes of each tube array includes a plurality of parallel tubes passing through and across a diameter of the corresponding engine cylinder, where a greater concentration of the plurality of parallel tubes is positioned around an exhaust valve seat of the corresponding engine cylinder.

* * * * *